C. & J. L. Little & R. M. Dalbey.
Dirt Scraper.
N° 69,452. Patented Oct. 1, 1867.

Witnesses:
A. W. Marr
V. D. Stockbridge

Inventors:
C. Little
Joel L. Little
R. M. Dalbey
per Alexander & Mason
Attorneys

United States Patent Office.

CYRUS LITTLE AND JOEL L. LITTLE, OF VAN WERT COUNTY, AND REUBEN M. DALBEY, OF SPRINGFIELD, OHIO, ASSIGNORS TO THEMSELVES AND DOTY & RAWLINS, OF SPRINGFIELD, OHIO.

Letters Patent No. 69,452, dated October 1, 1867.

IMPROVEMENT IN DIRT-SCRAPERS.

The Schedule referred to in these Letters Patent and making part of the same.

TO ALL WHOM IT MAY CONCERN:

Be it known that we, CYRUS LITTLE and JOEL L. LITTLE, of Van Wert county, and REUBEN M. DALBEY, of Springfield, in the county of Clark, and in the State of Ohio, have invented certain new and useful Improvements in Dirt-Scrapers; and do hereby declare that the following is a full, clear, and exact description thereof, reference being had to the accompanying drawings, and to the letters of reference marked thereon, making a part of this specification.

Figure 1:
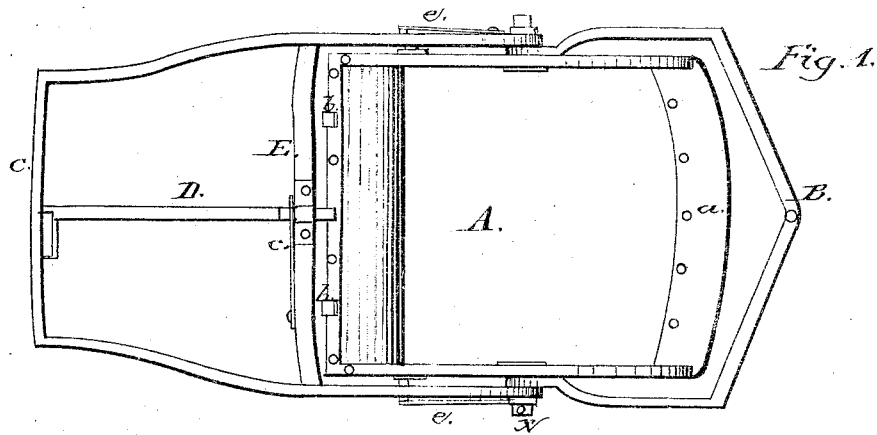
Figure 3:
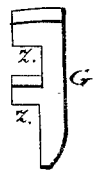
Figure 2:
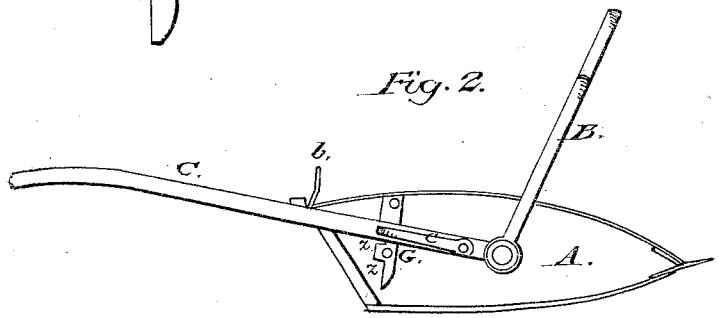

In the annexed drawings A represents the bed of the scraper, which is provided with a runner at each side, and a tail-board, having the usual metallic cutter at its front end $a$. B represents a metallic bar, pivoted at each side of the scraper, (at $x$,) and extending forward of the cutter $a$, and to which the power is applied for operating the machine. Pivoted at the same points $x$, on the sides of the runners, is a metallic bar, C, which forms the handles for the operator, and extends to the rear of the bed. This bar is provided with a stay, E, in the rear of the tail-board, and a small spring, $e\ e$, connected at each side near the pivots $x\ x$. G G represent metallic plates, which are attached to the outside of the runners near the tail-board, and which are provided with two notches, $z\ z'$, as shown in fig. 3, and slightly bevelled on the parts above the notches, so that the springs $e\ e$ will pass over the bevel and catch under the shoulders thus formed. D represents a horizontal bar extending from the rear part of the handle C, over the stay E, and projecting just over the top of the tail-board. $c$ is a small spring lying parallel with the stay, and catching over a pin in the bar D for throwing back in its proper place.

It will be seen that the scraper can be readily revolved on its pivots $x\ x$, whenever so desired. The horse or other power is applied to the bar B, and the scraper operated by a person standing at the rear of the handle C. After the cutter $a$ has filled the bed sufficiently, the operator draws the rod D and releases the scraper, when, at the same time, he elevates the handles and presses the cutter in the ground enough to allow the weight of the scraper to force the springs $e\ e$ open and the scraper make a revolution.

When the tail-board has assumed the place of the cutter it is slightly held above the earth by small bars $b\ b$, so as to more easily be turned the other half-way around.

Having thus fully described our invention, what we claim as new, and desire to secure by Letters Patent, is—

1. The plates G G, constructed as described, in combination with the springs $e\ e$ on the bar C, in the manner and for the purposes set forth.

2. The rod D, bar C, and springs $e\ e$, arranged in combination with the scraper A, as constructed and for the purposes specified.

In testimony that we claim the foregoing, we have hereunto set our hands this second day of April, 1867.

CYRUS LITTLE,
JOEL L. LITTLE,
REUBEN M. DALBEY.

Witnesses:
J. KREIDER MOWER,
GEO. MOWER.